(12) United States Patent
Yoshida et al.

(10) Patent No.: US 7,772,789 B2
(45) Date of Patent: Aug. 10, 2010

(54) MOTOR CONTROLLER

(75) Inventors: Kouya Yoshida, Kashihara (JP); Hayato Komatsu, Kashihara (JP)

(73) Assignee: JTEKT Corporation, Osaka (JP)

( * ) Notice: Subject to any disclaimer, the term of this patent is extended or adjusted under 35 U.S.C. 154(b) by 596 days.

(21) Appl. No.: 11/727,260

(22) Filed: Mar. 26, 2007

(65) Prior Publication Data
US 2007/0229021 A1   Oct. 4, 2007

(30) Foreign Application Priority Data
Mar. 29, 2006   (JP)  ............................. 2006-092091

(51) Int. Cl.
*H02P 21/00*   (2006.01)
(52) U.S. Cl. ............................. 318/400.02; 318/400.32; 318/727; 318/432
(58) Field of Classification Search ............ 318/400.02, 318/400.32, 727, 432, 400.33
See application file for complete search history.

(56) References Cited

U.S. PATENT DOCUMENTS

| 5,841,252 | A | 11/1998 | Dunfield | |
| 6,501,243 | B1 * | 12/2002 | Kaneko et al. | 318/700 |
| 6,909,290 | B2 * | 6/2005 | Imai et al. | 324/545 |
| 6,914,408 | B2 * | 7/2005 | Sawada et al. | 318/727 |
| 2002/0117990 | A1 * | 8/2002 | Sawada et al. | 318/727 |
| 2003/0062870 | A1 * | 4/2003 | Royak et al. | 318/727 |
| 2004/0100222 | A1 | 5/2004 | Karikomi | |
| 2005/0029972 | A1 | 2/2005 | Imai et al. | |
| 2006/0061319 | A1 | 3/2006 | Markunas et al. | |
| 2007/0001635 | A1 * | 1/2007 | Ho | 318/254 |
| 2007/0040528 | A1 * | 2/2007 | Tomigashi et al. | 318/650 |

FOREIGN PATENT DOCUMENTS

EP   1513250   3/2005

OTHER PUBLICATIONS

"Position and Velocity Sensorless Controls of Cylindrical Brushless DC Motors Using Disturbance Observers and Adaptive Velocity Estimatiors", Zhiqian Chen et al., (a Publication from the Transactions of The Institute of Electrical Engineers of Japan vol. 118-D, No. 7/8, Jul./Aug. 1998).

"A new Initial-Rotor-Position Estimation Method for SPM Synchronous Motors Using Spatially Rotating High-Frequency Voltage", Shinji Shinnaka et al., IEEJ Trans. 1A, vol. 124, No. 11, 2004.

* cited by examiner

*Primary Examiner*—Rina I Duda
(74) *Attorney, Agent, or Firm*—Rabin & Berdo, P.C.

(57) ABSTRACT

The motor controller drives an electric motor including a rotor as a field magnet and stator coils of U-phase, V-phase and W-phase. The motor controller includes an exploration voltage application unit for applying an exploration voltage to the stator coils of U-phase, V-phase and W-phase such that a voltage vector expressed by the voltage applied to the stator coils rotates in a predetermined cycle with maintaining a constant magnitude, an electric current detection unit for detecting an electric current flowing through the electric motor during the period in which the exploration voltage is applied by the exploration voltage application unit, and a rotor rotation angle estimation unit for estimating a rotation angle of the rotor based on a phase of the voltage vector when a magnitude of the electric current detected by the electric current detection unit takes a local maximum value.

4 Claims, 4 Drawing Sheets

VOLTAGE VECTOR

ELECTRIC CURRENT VECTOR

MOTOR CONTROLLER

BACKGROUND OF THE INVENTION

1. Field of the Invention

The present invention relates to a motor controller for sensorless driving of a brushless motor. A brushless motor is, for example, used as a source of steering assist force in an electric power steering apparatus.

2. Description of Related Art

A motor controller for drive controlling a brushless DC motor is generally configured to control the supply of a motor current in accordance with the output of a position sensor for detecting the rotational position of a rotor. However, the environmental resistance of the position sensor becomes an issue. Moreover, an expensive position sensor and wirings related to such position sensor obstruct reduction of cost and miniaturization. Thereupon, a sensorless driving system that drives a brushless DC motor without using a position sensor has been proposed. A sensorless driving system is a method for estimating the phase of a magnetic pole (an electrical angle of a rotor) by estimating the induced voltage caused by the rotation of a rotor.

Since induced voltage cannot be estimated when the rotor is not in rotation and when the rotor is rotating at an extremely low speed, the phase of the magnetic pole is estimated by other methods in those situations. Specifically, as shown in FIG. 2(a), a high frequency exploration voltage is applied on the U-phase stator coil 51, the V-phase stator coil 52 and the W-phase stator coil 53. A high frequency voltage vector (its magnitude is constant) that rotates along the direction of rotation of the rotor 50 is formed about the origin of the $\alpha$-$\beta$ coordinate, which is a fixed coordinate that assumes the rotation center of the rotor 50 as the origin. The high frequency voltage vector is a voltage vector that rotates in sufficiently high speed relative to the rotation speed of the rotor 50. With the application of this high frequency voltage vector, an electric current flows to the U-phase stator coil 51, the V-phase stator coil 52 and the W-phase stator coil 53. The electric current vector that expresses the magnitude and the direction of the electric current of these three phases on the $\alpha$-$\beta$ coordinates rotates about the origin.

The inductance of the rotor 50 have different values in d-axis and in q-axis. The d-axis is a magnetic pole axis along the direction of magnetic flux, and the q-axis is perpendicular to the d-axis (an axis that along with the direction of torque). Therefore, the magnitude of the electric current vector is large in the case of the direction close to the d-axis, and is small in the case of the direction close to the q-axis. As a consequence, the endpoint of the electric current vector draws an oval trajectory 55 on the $\alpha$-$\beta$ coordinates, taking the direction of d-axis of the rotor 50 as the major axis, as shown in FIG. 2(b).

Therefore, the magnitude of the electric current vector takes local maximum values in the directions of the N-pole and the S-pole of the rotor 50. That is, the magnitude of the electric current vector has two local maximum values in a single cycle of the electric current vector, as shown in FIG. 3(a). In this case, when the magnitude of the electric current vector is sufficiently large, the magnitude of the electric current vector in the direction of the N-pole takes the maximum value (cf. curve L1). This is because the inductance is smaller at the N-pole side than at the S-pole side of the rotor 50 due to the influence of a magnetic saturation of the stator.

Thus initially, a sufficient magnitude of high frequency voltage vector is applied, and the local maximum electric current vector corresponding to the N-pole is specified. Subsequently, a high frequency voltage vector that is smaller in magnitude is applied, thereby to estimate the phase of the rotor 50 based on the local maximum value of the electric current vector. More specifically, the phase angle (electrical angle) $\theta$ of the rotor 50 can be obtained from an $\alpha$-axis component $I_\alpha$ and a $\beta$-axis component $I_\beta$ of the electric current vector when the magnitude takes the local maximum value, by $\theta = \text{Tan}^{-1}(I_\alpha/I_\beta)$.

However, as shown in FIG. 2(b), distortion occurs to the response of the electric current at the application of high frequency voltage vector due to the difference between the inductances in the direction of d-axis and q-axis. As a consequence, a computer needs to conduct a complicated computing process in order to obtain the $\alpha$-axis component $I_\alpha$ and the $\beta$-axis component $I_\beta$ of the electric current vector. As a consequence, there is a problem in which computing load on the processor is heavy.

SUMMARY OF THE INVENTION

An object of the present invention is to provide a motor controller that can simplify the process for sensorless driving.

The motor controller of the present invention is for driving an electric motor comprising a rotor as a field magnet and stator coils of U-phase, V-phase and W-phase. The motor controller includes an exploration voltage application unit for applying an exploration voltage to the stator coils of U-phase, V-phase and W-phase such that the voltage vector expressed by the voltage applied to the stator coils rotates in a predetermined cycle with maintaining a constant magnitude, an electric current detection unit for detecting an electric current flowing through the electric motor during the period in which the exploration voltage is applied by the exploration voltage application unit, and a rotor rotation angle estimation unit for estimating a rotation angle (phase angle, electrical angle) of the rotor based on a phase of the voltage vector when a magnitude of the electric current detected by the electric current detection unit takes a local maximum value.

With the rotation of the voltage vector having a constant magnitude, a change occurs in the electric current flowing through the electric motor (magnitude of the electric current vector) due to the difference between the inductance in the direction of the polar axis of the rotor (direction of d-axis) and the inductance in the direction perpendicular to the polar axis (direction of q-axis). Specifically, the magnitude of the electric current vector takes a local maximum value when the vector is along the direction of the pole position (N-pole, S-pole) of the rotor. Thereupon, the rotation angle of the rotor is estimated based on the phase of the voltage vector when the electric current takes a local maximum value.

Since the voltage vector is constant in magnitude, calculation of the phase of the voltage vector is easier in comparison to that of the electric current vector in which a distortion occurs. Accordingly, the rotation angle of the rotor can be estimated sensorless, while simplifying the computing process.

It is preferable that the exploration voltage application unit applies the exploration voltage to the stator coil when the rotor is not in rotation or is rotating at an extremely low speed (for example, 250 rpm or under). Furthermore, it is preferable that the exploration voltage application unit applies the exploration voltage so that the voltage vector rotates faster than the rotation of the rotor (preferably, at a twentyfold speed or over).

The rotor rotation angle estimation unit may include a counting unit that conducts a counting operation synchronized with application of the exploration voltage by the exploration voltage application unit, and generates a counter value that expresses the phase of the voltage vector. In this case, the rotor rotation angle estimation unit may output, as rotation angle information expressing the rotation angle of the rotor, the counter value of the counting unit when the magnitude of electric current detected by the electric current detection takes a local maximum value.

The counting unit may be a unit that conducts the counting operation in a cycle T/n in which a rotation cycle T of the voltage vector is divided into n equal sections. In this case, the rotation angle can be estimated with 360/n degree resolution. Furthermore, the counting unit may be a unit that is initialized and starts the counting operation when the voltage vector is at a predetermined phase (for example at zero degrees). In this case, the counting unit clocks the elapsed time from the predetermined phase.

The electric current detection unit may include an unit for obtaining the magnitude of the electric current by computing a norm from a d-axis electric current and a q-axis electric current.

It is preferable that the motor controller further includes a rotation control signal generation unit for generating a control signal that is applied to the stator coils in order to rotate the rotor based on a rotor rotation angle estimated by the rotor rotation angle estimation unit.

The foregoing and other objects, features and effects of the present invention will become more apparent from the following description of the preferred embodiments with reference to the attached drawings.

DETAILED DESCRIPTION OF PREFERRED EMBODIMENTS

Figure 1:
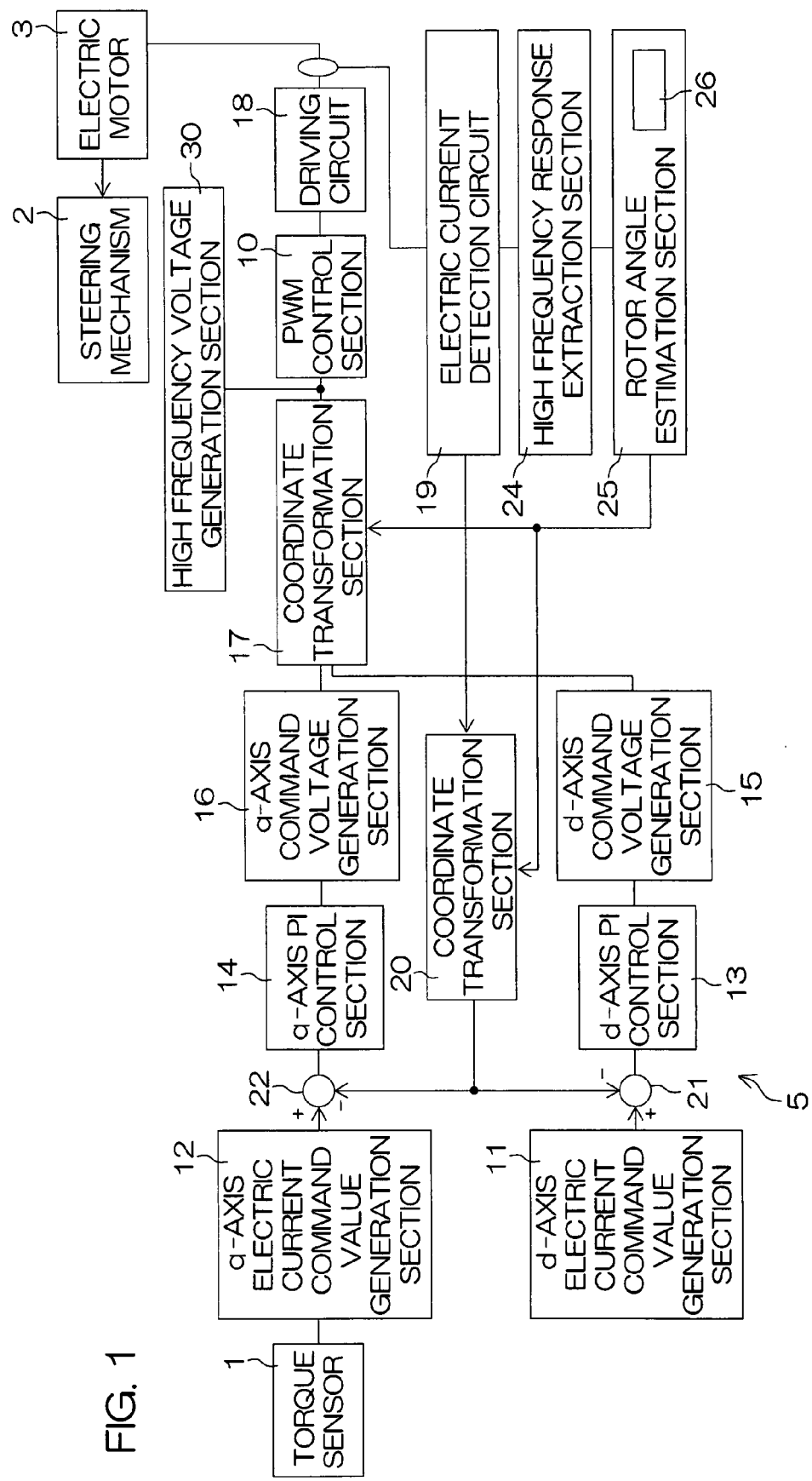
FIG. 1 is a block diagram for explaining the electrical construction of an electric power steering apparatus in which a motor controller according to one embodiment of the present invention is applied.
Figure 2:
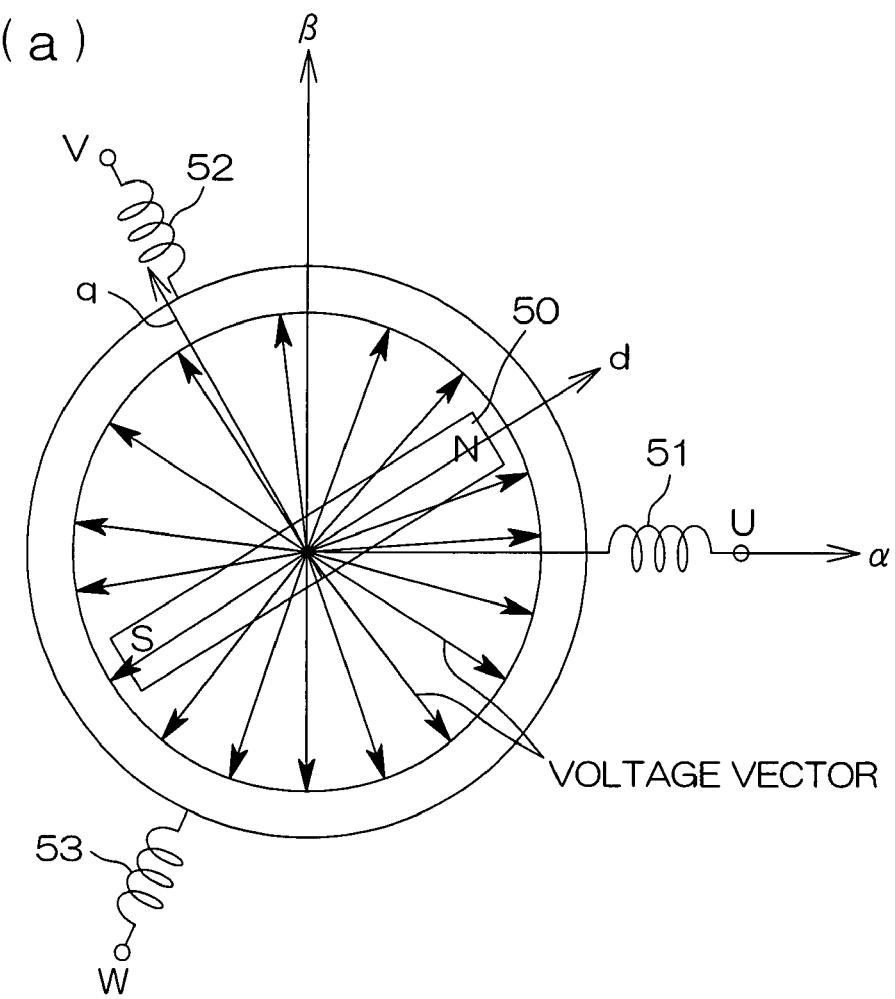
FIG. 2(a) and FIG. 2(b) are drawings for explaining the rotation of a high frequency voltage vector and an electric current vector.
Figure 2:
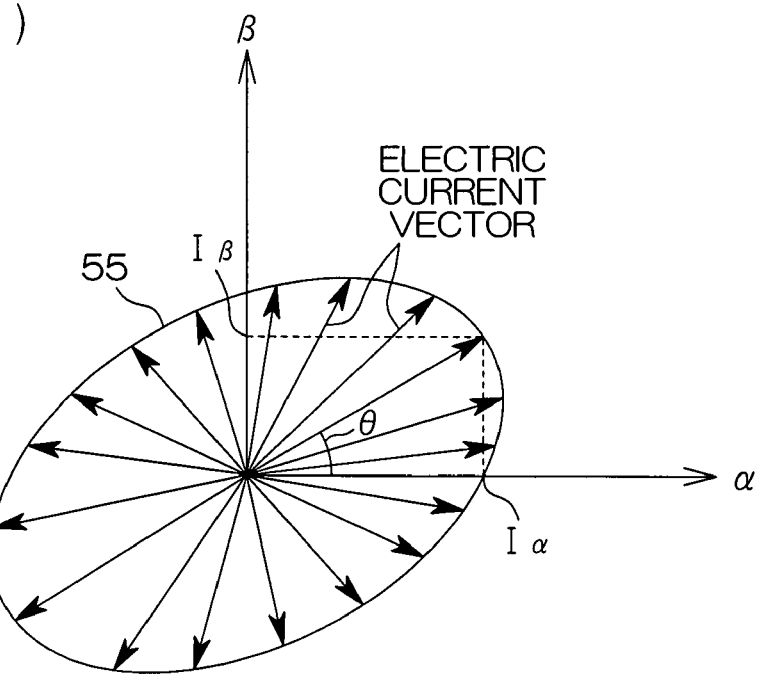

FIG. 1 is a block diagram for explaining the electrical construction of an electric power steering apparatus in which a motor controller according to one embodiment of the present invention is applied. This electric power steering apparatus comprises a torque sensor 1 for detecting a steering torque applied to a steering wheel of a motor vehicle, an electric motor 3 that supplies a steering assist force to a steering mechanism 2 of a motor vehicle, and a motor controller 5 that drive controls the electric motor 3. The motor controller 5 realizes an appropriate steering assist in accordance with the steering situation by driving the electric motor 3 in accordance with the steering torque which the torque sensor 1 detects. The electric motor 3 is a three-phase brushless DC motor in this embodiment, and as shown in FIG. 2(a), comprises a rotor 50 as a field magnet, and a U-phase stator coil 51, a V-phase stator coil 52 and a W-phase stator coil 53. The electric motor 3 may be an inner rotor type that is disposed with a stator at the exterior of a rotor, or may be an outer rotor type that is disposed with the stator at the interior of a tubular rotor.

The motor controller 5 comprises a d-axis electric current command value generation section 11, a q-axis electric current command value generation section 12, a d-axis PI (proportional integral) control section 13, a q-axis PI control section 14, a d-axis command voltage generation section 15, a q-axis command voltage generation section 16, a coordinate transformation section 17 that transforms the d-axis command voltage and the q-axis command voltage into another coordinate voltages, a PWM control section 10, a driving circuit (inverter circuit) 18, an electric current detection circuit 19 as an electric current detection unit, and a coordinate transformation section 20 that transforms the output of the electric current detection circuit 19 into another coordinate current.

The d-axis electric current command value generation section 11 generates a command value of a d-axis electric current component that is along the direction of a rotor magnetic pole of the electric motor 3. Similarly, the q-axis electric current command value generation section 12 generates a command value of a q-axis electric current component, that is perpendicular to d-axis (the d-q coordinate plane is along rotation plane of the rotor 50). The d-axis electric current command value $I_d^*$ and the q-axis electric current command value $I_q^*$ are expressed by the following equations (1) and (2), in which an electric current command value I* expresses the amplitude of an electric current (sinusoidal electric current) to be supplied to the U-phase, V-phase, and the W-phase of the electric motor 3.

[Equation 1]

$$I_d^* = 0 \tag{1}$$

$$I_q^* = -\sqrt{\frac{3}{2}} I^* \tag{2}$$

Therefore, the d-axis electric current command value generation section 11 is configured to generate a constant "zero", and the q-axis electric current command value generation section 12 is configured to generate a q-axis electric current command value $I_q^*$ in accordance with the steering torque. More specifically, the q-axis electric current command value generation section 12 may be configured by a map (table) that stores the q-axis electric current command value $I_q^*$ corresponding to the steering torque.

For example, the electric current detection circuit 19 detects a U-phase electric current $I_U$ and a V-phase electric current $I_V$ of the electric motor 3. The detected value is supplied to the coordinate transformation section 20. The coordinate transformation section 20 transforms the U-phase electric current $I_U$ and the V-phase electric current $I_V$ into electric current components on the d-q coordinates, namely, a d-axis electric current $I_d$ and a q-axis electric current $I_q$ in accordance with the following equations (3) and (4).

$$I_d = -\sqrt{2} \sin\left(\theta - \frac{2\pi}{3}\right) \cdot I_U + \sqrt{2} \sin\theta \cdot I_V \tag{3}$$

$$I_q = -\sqrt{2} \cos\left(\theta - \frac{2\pi}{3}\right) \cdot I_U + \sqrt{2} \cos\theta \cdot I_V \tag{4}$$

The motor controller 5 comprises a d-axis electric current deviation computing section 21 for computing the deviation of the d-axis electric current $I_d$ to the d-axis electric current command value $I_d^*$, and a q-axis electric current deviation computing section 22 for computing the deviation of the q-axis electric current $I_q$ to the q-axis electric current command value $I_q^*$. The deviations that are output by these sections are supplied respectively to the d-axis PI control section 13 and the q-axis PI control section 14, and are processed through the PI computing process. Then, in accordance with these results of computing, a d-axis command voltage $V_d^*$ and a q-axis command voltage $V_q^*$ are generated by the d-axis command voltage generation section 15 and the q-axis command voltage generation section 16, and supplied to the coordinate transformation section 17. The coordinate transformation section 17 transforms the d-axis command voltage $V_d^*$ and the q-axis command voltage $V_q^*$ into voltage command values $V_U^*$, $V_V^*$, $V_W^*$ of the U-phase, the V-phase and the W-phase in accordance with the following equations (5), (6) and (7).

$$V_U^* = \sqrt{\frac{2}{3}} \{\cos\theta \cdot V_d^* - \sin\theta \cdot V_q^*\} \tag{5}$$

$$V_V^* = \sqrt{\frac{2}{3}} \left\{\cos\left(\theta - \frac{2\pi}{3}\right) \cdot V_d^* - \sin\left(\theta \cdot \frac{2\pi}{3}\right) \cdot V_q^*\right\} \tag{6}$$

$$V_W^* = \sqrt{\frac{2}{3}} \left\{\cos\left(\theta - \frac{4\pi}{3}\right) \cdot V_d^* - \sin\left(\theta \cdot \frac{4\pi}{3}\right) \cdot V_q^*\right\} \tag{7}$$

The PWM control section 10 generates a driving signal of a duty ratio controlled in accordance with the three-phase voltage command values $V_U^*$, $V_V^*$, $V_W^*$, and supplies the signal to the driving circuit 18. Thereby, voltages of a duty ratio in accordance with the voltage command values $V_U^*$, $V_V^*$, $V_W^*$ are applied to the respective phases of the electric motor 3.

A phase angle (electrical angle) θ of the rotor 50 is necessary for coordinate transformation of the above-mentioned equations (3) to (7). Thereupon, the motor controller 5 comprises a rotor angle estimation section 25 for estimating the rotor phase angle θ without using a position sensor. An output of the electric current detection circuit 19 is supplied to this rotor angle estimation section 25 via a high frequency response extraction section 24. The high frequency response extraction section 24 is, for example, a highpass filter.

The motor controller 5 further comprises a high frequency voltage generation section 30 as an exploration voltage application unit, in order to estimate the phase angle θ of the rotor 50 when the rotor 50 is not in rotation and when the rotor 50 is rotating at an extremely low speed (250 rpm or under). The high frequency voltage generation section 30 generates the voltage command values for applying a high frequency sinusoidal voltage of a sufficiently high frequency (for example, 200 Hz) in comparison to the rated frequency of the electric motor 3, as an exploration voltage, to the stator coils 51, 52, 53 of the U-phase, V-phase, and W-phase of the electric motor 3. The high frequency voltage generation section 30 then supplies the values to the PWM control section 10. More specifically, a high frequency voltage vector that spatially rotates about the center of rotation of the rotor 50 is applied by sequentially repeating a V-W-phase electrification, a W-U-phase electrification, and a U-V-phase electrification through application of a high frequency voltage of a duty ratio at a degree that does not induce the rotation of the rotor 50. The high frequency voltage vector is a voltage vector (rotating constant voltage vector) having a constant magnitude that rotates about the origin of the α-β coordinate at a constant speed. The α-β coordinate is a fixed coordinate that assumes the center of rotation of the electric motor 50 as the origin (c.f. FIG. 2(a)).

The high frequency voltage generation section 30 generates a command value for applying a high frequency voltage (exploration voltage) such as mentioned above, when the rotor 50 is not in rotation and when the rotor 50 is rotating at an extremely low speed, then supplies the value to the PWM control section 10. When the rotation of the rotor 50 is sufficiently fast (for example, over 250 rpm), the high frequency voltage generation section 30 stops the generation of a high frequency voltage command.

The high frequency response extraction section 24 conducts a filtering process that extracts a frequency component corresponding to the frequency of the high frequency voltage, which is generated by the high frequency voltage generation section 30 from the output signal of the electric current detection circuit 19 when the rotor 50 is not in rotation and when the rotor 50 is rotating at an extremely low speed. Furthermore, the high frequency response extraction section 24 outputs the output signal of the electric current detection circuit 19 through to the rotor angle estimation section 25 without conducting the above-mentioned filtering process when the rotation of the rotor 50 is sufficiently fast (for example, over 250 rpm).

Therefore, the rotor angle estimation section 25 estimates the rotor phase angle θ based on the high frequency component extracted by the high frequency response extraction section 24 when the rotor 50 is not in rotation and when the rotor 50 is rotating at an extremely low speed. Furthermore, when the rotation of the rotor 50 is sufficiently fast, the rotor angle estimation section 25 estimates the induced voltage that occurs in the stator coils 51, 52, 53 of the U-phase, V-phase, and the W-phase with the rotation of the rotor 50, then estimates the phase angle θ of the rotor 50 based on the voltage. In regard to the estimation of an induced voltage, refer to, for example, "Position and Velocity Sensorless Controls of Cylindrical Brushless DC Motors Using Disturbance Observers and Adaptive Velocity Estimators", Zhiqian Chen et al., (a Publication from the Transactions of The Institute of Electrical Engineers of Japan Vol. 118-D, No. 7/8, July/August, 1998).

Figure 3:
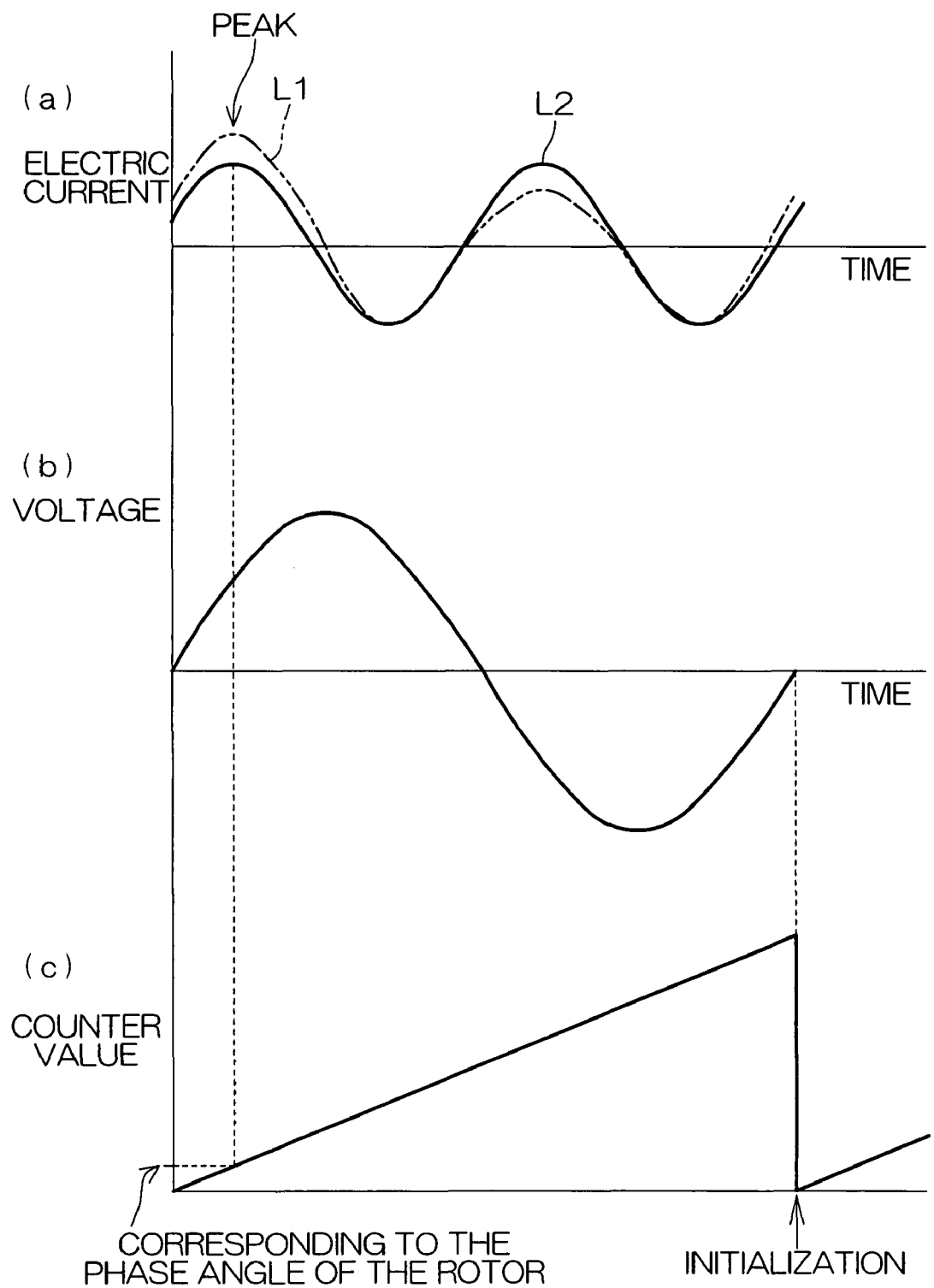
FIG. 3(a), FIG. 3(b) and FIG. 3(c) are drawings for explaining the rotor phase angle estimation operation due to application of a high frequency voltage vector.

The rotor angle estimation section 25 comprises a counter 26 as a counting unit that is used for obtaining a rotation angle of the rotor 50 when the rotor 50 is not in rotation and when the rotor 50 is rotating at an extremely low speed. The counter 26 repeatedly operates so that the counter is initialized and starts a counting operation when a high frequency voltage vector applied by the function of the high frequency voltage generation section 30 is along the α-axis (coinciding with the direction of the U-phase) (namely, when the phase of the high frequency voltage vector is zero). The counter 26 counts up, for example, in every cycle of T/n in which the rotation cycle of the high frequency voltage (time needed for a high frequency voltage vector to rotate 360 degrees in an electrical angle of the rotor 50) T is divided into n equal sections (n denotes the number of sampling per single cycle. For example, n=360.). The output represents the phase of the high frequency voltage vector. As shown in FIG. 3(a), when the counter value of the counter 26 is referred at the point where the local maximum value of the output (electric current) of the high frequency response extraction section 24 is detected, the counter value expresses the position of the magnetic pole of the rotor 50 (the phase angle of the high frequency voltage vector when the magnitude of the electric current vector is the maximum). FIG. 3(a) represents a variation with time of the magnitude of an electric current vector, FIG. 3(b) represents a variation with time of the β-axis component of the high frequency voltage vector, and FIG. 3(c) represents a variation with time of the counter value of the counter 26.

Figure 4:
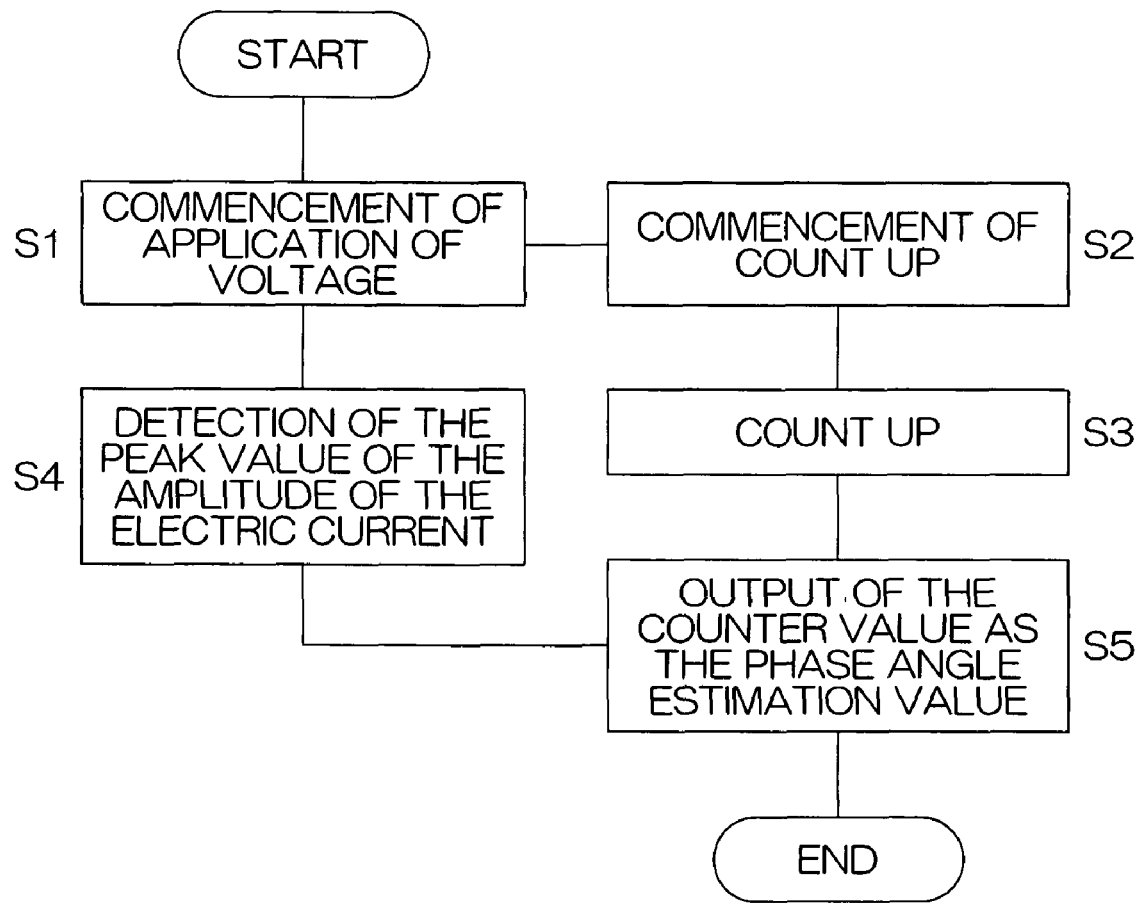
FIG. 4 is a flowchart for explaining the rotor phase angle estimation operation.

FIG. 4 is a flow chart for explaining the rotor phase angle estimation operation when the rotor 50 is not in rotation or is rotating at an extremely low speed, and corresponds to a single cycle (single rotation) of the high frequency voltage applied by the function of the high frequency voltage generation section 30. The counter 26 is initialized in synchronization with the start of application of the high frequency voltage vector (phase angle zero, in the direction of α-axis), and counting is started (Steps S1, S2, S3). On the other hand, the rotor angle estimation section 25 detects the local maximum value of the output of the high frequency response extraction section 24 (Step S4), and outputs the counter value of the counter 26 as a rotor phase angle estimation value when the local maximum value is detected (Step S5).

As described previously, the magnitude of the electric current vector takes local maximum values when the direction of the electric current vector is directed in the direction of the N-pole and the S-pole of the rotor 50. When the magnitude of the electric current vector is large enough to cause a magnetic saturation of the stator, the magnitude of the electric current vector when the electric current vector is directed to the N-pole of the rotor 50 is larger than that of the electric current vector when the electric current vector is directed to the S-pole of the rotor (c.f. curve L2 of FIG. 3(a)).

Thereupon, when the position of the N-pole is unknown, the high frequency voltage generation section 30 applies a high frequency voltage vector having a magnitude that can cause a magnetic saturation of the stator. On the other hand, the rotor angle estimation section 25 judges the position of the N-pole based on the counter value of the counter 26 when the magnitude of the electric current vector is the maximum value in a single cycle of the high frequency voltage vector (N-pole judging operation). That is, the local maximum value corresponding to the N-pole is specified among the local maximum values that appear twice in a single cycle of the high frequency voltage vector. Thereafter, the high frequency voltage generation section 30 applies a high frequency voltage vector with a magnitude that is not as large as to cause a magnetic saturation. The rotor angle estimation section 25 refers to the counter value of the counter 26 at the position of the local maximum value corresponding to the maximum value specified by the N-pole judging operation, then outputs the counter value as the position of the rotor angle (c.f. curve L2 of FIG. 3(a)).

While one embodiment of the present invention has been described as mentioned above, the present invention can be further implemented in other configurations. For example, in the above-mentioned embodiment, although the rotor angle estimation section 25 refers to the output of the high frequency response extraction section 24, a norm $\{I_d^2+I_q^2\}^{1/2}$ of the electric current components $I_d$, $I_q$ after transformation by the coordinate transformation section 20 may be used as the magnitude of the electric current vector. In such case, the rotor angle estimation section 25 may obtain the phase of the high frequency voltage vector by the counter value of the counter 26 when the norm $\{I_d^2+I_q^2\}^{1/2}$ takes the local maximum value.

Furthermore, in the above-mentioned embodiment, the rotor phase angle θ is obtained using the counter 26 that counts in synchronization with the application of the high frequency voltage vector; however, the rotor phase angle θ can be obtained without using the counter 26. For example, the phase angle θ may be obtained by $\theta=\mathrm{Tan}^{-1}(V_\alpha/V_\beta)$ from an α-axis component $V_\alpha$ and an β-axis component $V_\beta$ of the high frequency voltage vector when the local maximum value of the electric current is detected.

While the present invention has been described in detail by way of the embodiment thereof, it should be understood that the foregoing disclosure is merely illustrative of the technical contents of the present invention but not limitative to the same. The spirit and the scope of the present invention are to be limited only by the appended claims.

This application corresponds to Japanese Patent Application No. 2006-92091 file with the Japanese Patent Office on Mar. 29, 2006, the whole disclosure thereof is incorporated herein by reference.

What is claimed is:

1. A motor controller for driving an electric motor including a rotor as a field magnet and stator coils of U-phase, V-phase and W-phase, the motor controller comprising:
    an exploration voltage application unit for applying an exploration voltage to the stator coils of U-phase, V-phase and W-phase such that a voltage vector expressed by the voltage applied to the stator coils rotates in a predetermined cycle with maintaining a constant magnitude,
    an electric current detection unit for detecting an electric current flowing through the electric motor during the period in which the exploration voltage is applied by the exploration voltage application unit, and
    a rotor rotation angle estimation unit for estimating a rotation angle of the rotor based on a phase of the voltage vector when a magnitude of the electric current detected by the electric current detection unit takes a local maximum value.

2. A motor controller as set forth in claim 1, wherein the rotor rotation angle estimation unit includes a counting unit for conducting a counting operation synchronized with application of the exploration voltage by the exploration voltage application unit, and generating a counter value that expresses the phase of the voltage vector, and
    wherein the rotor rotation angle estimation unit outputs, as rotation angle information for expressing the rotation angle of the rotor, the counter value of the counting unit when the magnitude of the electric current detected by the electric current detection unit takes a local maximum value.

3. A motor controller as set forth in claim 2, wherein the counting unit conducts the counting operation in a cycle T/n in which a rotation cycle T of the voltage vector is divided into n equal sections.

4. A motor controller as set forth in claim 1, wherein the motor controller further includes a rotation control signal generation unit for generating a control signal that is applied to the stator coils in order to rotate the rotor based on a rotation angle of the rotor estimated by the rotor rotation angle estimation unit.

* * * * *